US009377215B2

(12) United States Patent
Sherwin

(10) Patent No.: US 9,377,215 B2
(45) Date of Patent: Jun. 28, 2016

(54) SOLAR COOKING APPARATUS

(75) Inventor: Patrick Sherwin, Cincinnati, OH (US)

(73) Assignee: APPLIED SUNSHINE, LLC, Cincinnati, OH (US)

( * ) Notice: Subject to any disclaimer, the term of this patent is extended or adjusted under 35 U.S.C. 154(b) by 238 days.

(21) Appl. No.: 13/555,213

(22) Filed: Jul. 23, 2012

(65) Prior Publication Data
US 2013/0022727 A1 Jan. 24, 2013

Related U.S. Application Data

(60) Provisional application No. 61/510,713, filed on Jul. 22, 2011.

(51) Int. Cl.
F24J 2/00 (2014.01)
F24J 2/02 (2006.01)
A23L 1/01 (2006.01)
F24J 2/14 (2006.01)
F24J 2/54 (2006.01)
F24J 2/12 (2006.01)
F24J 2/46 (2006.01)

(52) U.S. Cl.
CPC ............... F24J 2/02 (2013.01); A23L 1/0128 (2013.01); F24J 2/12 (2013.01); F24J 2/145 (2013.01); F24J 2/46 (2013.01); F24J 2/541 (2013.01); A23V 2002/00 (2013.01); Y02B 40/18 (2013.01); Y02E 10/45 (2013.01); Y02E 10/47 (2013.01)

(58) Field of Classification Search
CPC .......... Y02E 10/44; Y02E 10/40; Y02E 10/20
USPC .................... 126/526, 681; 426/523
See application file for complete search history.

(56) References Cited

U.S. PATENT DOCUMENTS

| 2,994,318 | A | * | 8/1961 | Lee | A47J 27/08 126/681 |
| 4,002,499 | A | * | 1/1977 | Winston | F24J 2/1047 126/635 |
| 4,083,357 | A | * | 4/1978 | Fischer | F24J 2/02 126/682 |
| 4,099,516 | A | * | 7/1978 | Caulier | F21V 7/08 126/667 |
| 4,134,392 | A | * | 1/1979 | Livermore | F24J 2/055 126/657 |
| D256,656 | S | * | 9/1980 | Naccach | D7/324 |
| 4,262,660 | A | * | 4/1981 | Ilich | F24J 2/02 126/608 |
| 4,281,644 | A | * | 8/1981 | Chiles | F24J 2/02 126/682 |
| 4,442,828 | A | * | 4/1984 | Takeuchi | F24J 2/02 126/681 |

(Continued)

FOREIGN PATENT DOCUMENTS

WO    WO 2010135909 A1 * 12/2010 ............. A47J 27/04

Primary Examiner — Avinash Savani
Assistant Examiner — George R Blum
(74) Attorney, Agent, or Firm — Larson IP, LLC; Jon Scott Larson

(57) ABSTRACT

The present invention relates to a solar cooking apparatus, comprising: a first solar reflector; a second solar reflector; a solar collection element; and a solar collection element holder, wherein the first solar reflector and the second solar reflector are concave, and opposably arranged and aligned with a solar collection element axis, each reflector having a range of motion on a plane perpendicular to the solar collection element axis, and focusing radiation at the solar collection element, which rapidly heats when the first and/or second solar reflectors are in an opened position, the first and second solar reflectors protectably encase the solar collector when in a closed position. The solar cooking apparatus is adjustable and, in some embodiments, portable.

10 Claims, 14 Drawing Sheets

(56) References Cited

U.S. PATENT DOCUMENTS

| | | | | | |
|---|---|---|---|---|---|
| 4,554,908 A * | 11/1985 | Hanlet | .................... | F24J 2/0488 | |
| | | | | 126/652 | |
| 5,676,128 A * | 10/1997 | Cowart | ...................... | F24J 2/02 | |
| | | | | 126/657 | |
| 5,950,618 A * | 9/1999 | Wu | ............................ | F24J 2/02 | |
| | | | | 126/596 | |
| 6,023,810 A * | 2/2000 | Gessert | ............... | A47J 37/0786 | |
| | | | | 15/145 | |
| 6,363,928 B1 * | 4/2002 | Anderson, Jr. | ............. | F24J 2/14 | |
| | | | | 126/573 | |
| 2011/0023868 A1 * | 2/2011 | Seller | ......................... | F24J 2/02 | |
| | | | | 126/681 | |
| 2012/0263845 A1 * | 10/2012 | Shi | ......................... | A47J 27/04 | |
| | | | | 426/510 | |
| 2013/0022727 A1 * | 1/2013 | Sherwin | ................ | A23L 1/0128 | |
| | | | | 426/523 | |
| 2015/0208848 A1 * | 7/2015 | Huang | ............... | A47J 27/21166 | |
| | | | | 99/403 | |

\* cited by examiner

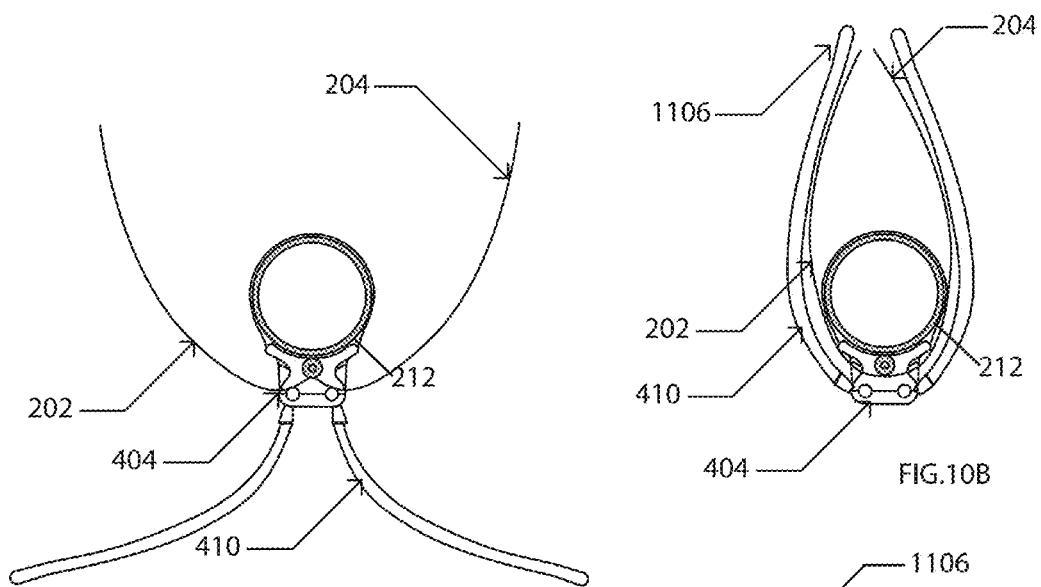
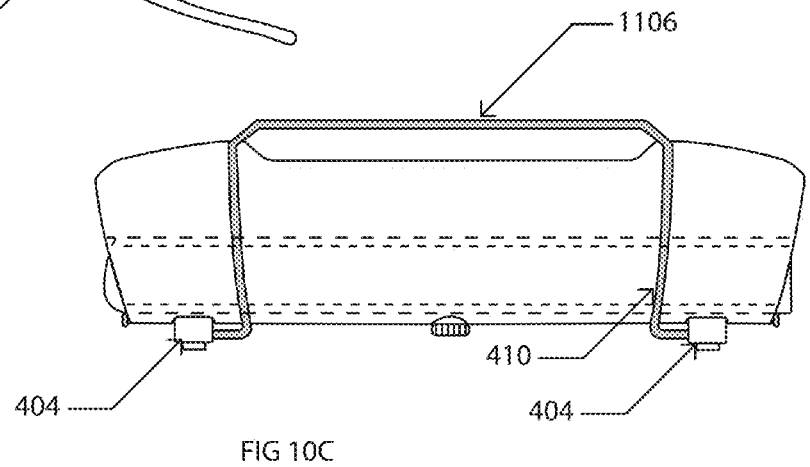
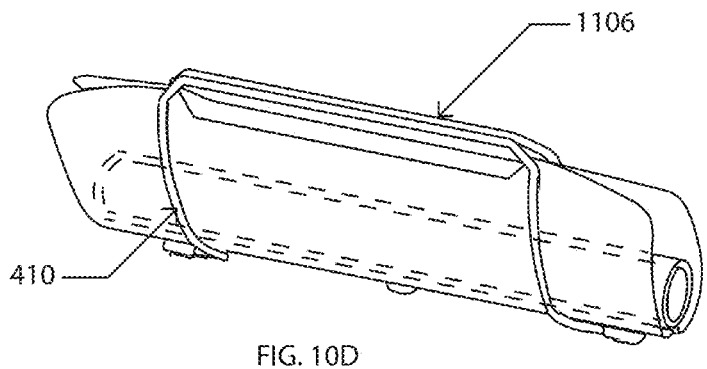

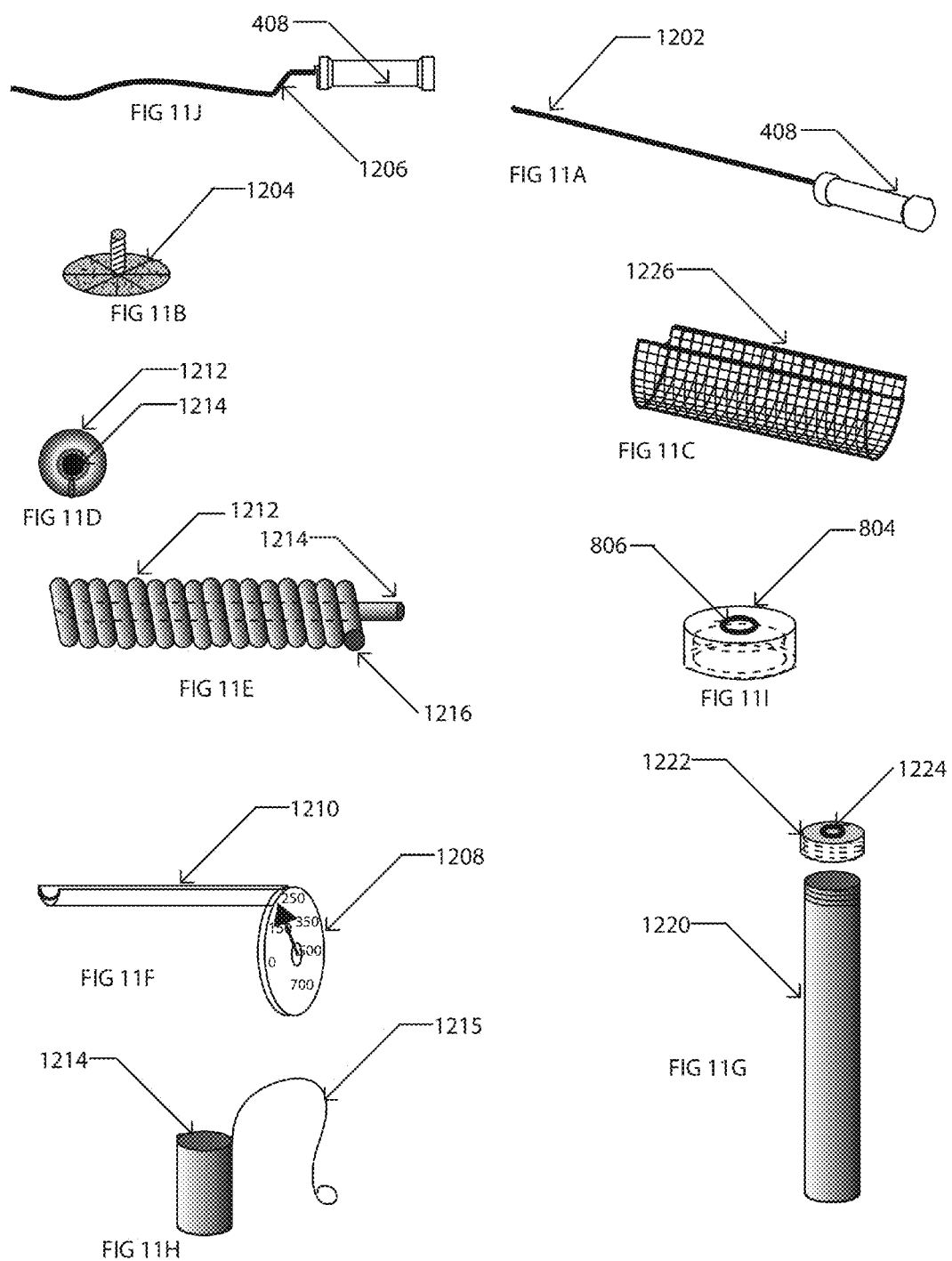

SOLAR COOKING APPARATUS

CROSS-REFERENCE TO RELATED APPLICATION

This application claims the benefit of U.S. Provisional Application No. 61/510,713, filed Jul. 22, 2011.

BACKGROUND

In the outdoors, many modern conveniences are left behind. Backyard enthusiasts, tailgaters, and anybody in need of a portable heating source must plan accordingly, bringing equipment as well as a source of power or fuel. For example, conventional portable cookers can be electric, gas, or charcoal powered. While each variety is useful, electric grills require electric outlets, which seriously hinder their portability. Portable gas grills typically require compressed propane tanks, which come from a finite resource, can pose a fire hazard and are usually disposable thereby generating waste. Charcoal grills require charcoal briquettes, which are dirty, bulky, and are difficult and dangerous to dispose of after use. These grills are often bulky and take lengthy times to preheat, as well as cool down after use. Some of these drawbacks have been overcome by solar powered cookers.

Solar cookers are advantageous over conventional cookers because they are fueled solely by sunlight, without the use of traditional fuels. Moreover, solar cookers do not produce any smoke. Therefore, they do not contribute health-damaging pollutants or waste associated with cookers needing carbon-based fuels. Nevertheless, known solar cookers fail to work as intended because they need to be large, they are inefficient, and they are difficult to operate. For these reasons, no solar cooker has succeeded in achieving widespread use.

There are several recognizable solar cookers in the art. While, under desirable conditions, they all are capable of generating heat to cook, these cookers all have substantial shortcomings. For example, concentrating cookers are disadvantageous because they possess no means to minimize heat loss; they are large and awkward to operate; they reflect light at the operator and, therefore, require eye shielding to use; and they are messy, as drippings fall freely onto the reflector.

Box cookers are insulated. However, they can only achieve temperatures of about 300° F. because most of the heat escapes through a glass panel. These devices are typically bulky, heavy, slow to cook, and fragile.

The solar panel cooker is another example of a large and awkward apparatus. It is also disadvantageous because it takes a long time to generate low heat levels. The panel cooker is a variation of the above-mentioned concentrator. It follows that this cooker is inefficient because, like the concentrating cooker, it also lacks any means to store or trap heat energy.

There is a clear need to improve the concentration of solar energy to increase the thermal energy available to cook. Also, there is a need to retain that thermal energy by means of insulation. A disadvantage of a conventional parabolic reflector, such as the reflector described in U.S. Pat. No. 4,002,499, is that the solar energy is concentrated in a very small area, too small to be desirable for most cooking purposes. Moreover, the image area moves too quickly across the cooking container, unless the parabola is adjusted frequently. The present invention provides an improvement over known solar cookers by utilizing a non-imaging reflector that strikes a larger area relative to conventional parabolic reflectors, thereby increasing solar energy capture, and incorporating a non-tracking capability for ease of use. It remains that there are no known solar cookers that have the portability of conventional cookers and are able to generate sufficient heat to accomplish heating tasks, such as cooking, roasting, searing, baking, vaporizing, or frying, in a reasonable time. There is a need for an improved efficient working portable solar cooker.

The present invention shows superior performance in a wide range of heating applications such as: cooking, roasting, searing, baking, sterilizing, boiling, dehydrating, steeping, vaporizing, smoking, and frying.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The present invention is a practical and elegant design, which may incorporate the qualities of durability, mobility, and convenience into an apparatus that a consumer/user can easily operate and understand. Using principles of radiant energy reflection, absorption and insulation, the present invention provides a platform for solid performance and incomparable results within the solar cooking field.

The present invention is a solar cooking apparatus, which comprises at least a first solar reflector; a second solar reflector; a solar collection element; and a solar collection element holder, wherein the first solar reflector and the second solar reflector are concave, and opposably and connectably arranged respectively upon a first solar reflector hinge and a second solar reflector hinge that are both aligned with a solar collection element axis, each reflector having a range of motion on a plane perpendicular to the solar collection element axis, and focusing radiation at the solar collection element from a reflective surface when the first and/or second solar reflectors are in an opened position, the first and second solar reflectors protectably encase the solar collector when in a closed position. The arrangements of features described herein allow the solar cooking apparatus to be adjustable relative to any of a horizontal plane, vertical plane, and/or the solar collection element axis.

The present invention can work whenever the sun is shining. Water can be heated and most foods can be prepared even on the coldest winter day. The apparatus described herein permits quick simple adjustment to maximize and focus solar collection. To this end, the solar cooking apparatus may comprise a solar collection element that can be a transparent evacuated vacuum tube, which has a tube-in-tube design. The inner tube can have layers comprised of aluminum-nitrile/stainless steel/copper coatings, which may be applied by spraying, etc. The inner tube may then be connectably sealed under vacuum inside a clear outer tube. The vacuum provides insulation, which prevents heat from escaping or radiating from the inner tube. Therefore, the trapped heat cannot travel from the inner tube to the outer tube. Hence, even though the invention can achieve an internal temperature of about 700° F. (371° C.), under good lighting conditions, there is minimal risk of being burned by touching the outer tube. Finally, the tube can be shatter resistant. For example, the solar collection element may be coated with a shatter resistant coating and/or fitted inside a clear sheath for protection from external and internal forces (e.g., from thermal expansion/contraction, dropping).

The present invention may also be used, comprising the steps of positioning the each of the first and the second solar reflectors into the opened position; positioning the apparatus on a tilt plane perpendicular to direct sun rays; heating the inner tube of the solar collection element to a desirable temperature; placing a cookable substance upon the cooking surface of the cooking implement; inserting the cookable substance upon the cooking implement into the inner tube; cooking the cookable substance for a predetermined amount of time; and removing the cooking implement. In one embodiment of the present invention the user open a solar cooking apparatus for heating, insert a cooking implement into the inner tube of an opened and heating solar collection apparatus, which cradles the food to be prepared by the solar cooking apparatus.

Other objects and advantages will become apparent from reading the following detailed description of the invention in which reference is made to the accompanying drawings.

BRIEF DESCRIPTION OF THE DRAWINGS

FIG. 10A is an end view of an opened solar cooking apparatus on a stand in an open position;

FIG. 10B is an end view of a closed solar cooking apparatus with the stand in a closed position;

FIG. 10C is a side view of a closed solar cooking apparatus with the stand in a closed position;

FIG. 10D is a perspective view of a closed solar cooking apparatus with the stand in a closed position;

FIG. 11A is a perspective view of a skewer cooking implement;

FIG. 11B is a side view of a French Press plunger;

FIG. 11C is a perspective view of a wire mesh cooking implement;

FIG. 11D is an end view of a vaporizer;

FIG. 11E is a side view of a vaporizer;

FIG. 11F is a side view of a temperature gauge;

FIG. 11G is a side view of a closed cylinder implement;

FIG. 11H is a side view of a grease collection cup;

FIG. 11I is a side view of a liquid tight cap;

FIG. 11J is a side view of a bent rod cooking implement;

WRITTEN DESCRIPTION

Figure 1:
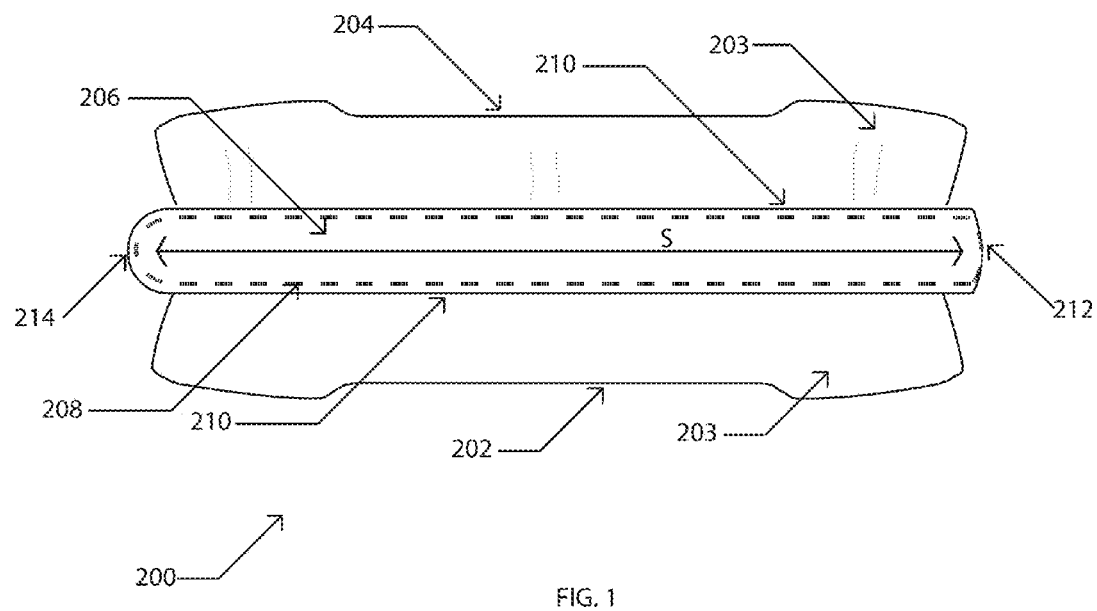
FIG. 1 is a top view of a solar cooking apparatus in an opened position.
Figure 2B:
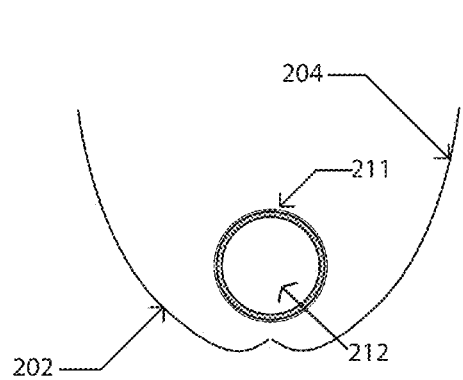
FIG. 2B is an end view of a solar cooking apparatus in an opened position, without a stand.
Figure 2C:
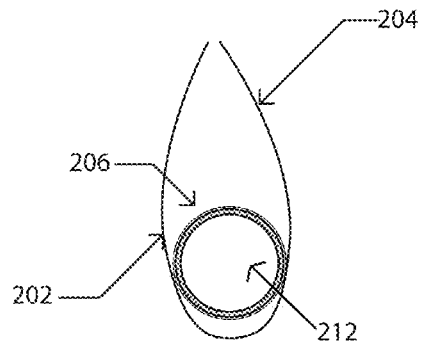
FIG. 2C is an end view of a solar cooking apparatus in a closed position, without a stand.
Figure 2A:
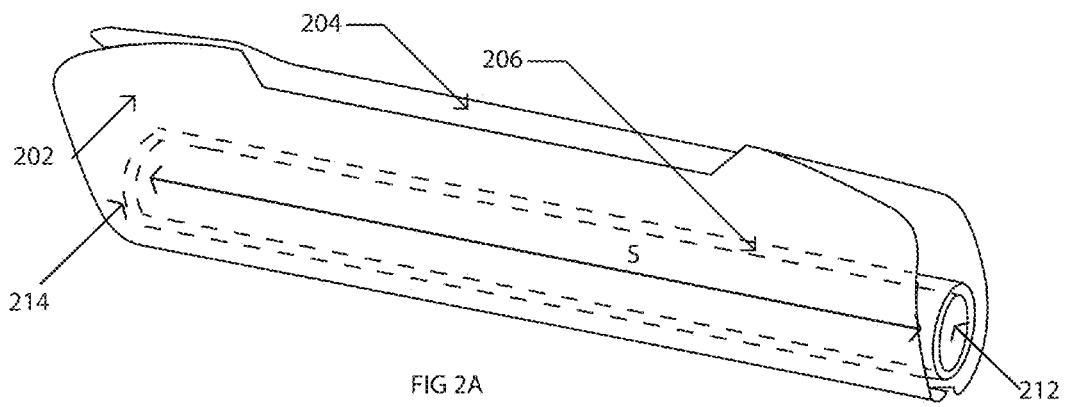
FIG. 2A is a perspective view of a solar cooking apparatus in a closed position, without a stand.

For purposes of the description hereinafter, spatial orientation terms, if used, shall relate to the referenced embodiment as it is oriented in the accompanying figures, or as otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

The following terminology is used herein to describe the relationship between the orientation of the solar cooking apparatus relative to the sun's rays. The sun's height above the horizon is called altitude. The solar cooking apparatus collect maximum solar energy when the sun's rays shine perpendicular (90°) to the open reflector plane. In order to create this perpendicular relationship, the user will adjust the tilt angle of the cooker. For example, if the sun is directly overhead (90° above the horizon) the solar cooker would be placed parallel to the earth's plane or horizontal plane and thus have a 0° tilt angle.

As used herein, "cooking" is construed as any heat driven application, which includes processes such as sterilization, vaporization, warming, heating, boiling, baking, pressure cooking, frying, steeping, dehydration, roasting, smoking, etc.

In addition to tilt angle (relating to the height of the sun in the sky), the solar cooker will have to be adjusted for azimuth which relates to the sun's apparent location east and west of true south (in the Northern Hemisphere). On the solar equinox, this azimuth angle changes over a 12 hour period, from 90° east of true south when the rises, to 90° west of true south when the sun sets.

Azimuth adjustments to the solar cooker can be performed via rotational movements whereby the user may physically move or shift the entire apparatus as it rotates towards the sun's hourly degree. Tilt angle adjustments to the solar cooker can be done in one of two ways presently available. These two methods are differentiated along a horizontal solar collection element axis and a vertical solar collection element axis. Each method will be described further below along with a more specific description of the mechanics.

Beginning with FIGS. 1 and 2A-C, the solar cooking apparatus 200 may comprise a first solar reflector 202, a second solar reflector 204, each solar reflector having a reflective surface 203, and a solar collection element 206. The solar collection element 206 may comprise an inner tube 208, and outer tube 210, an open end 212, and closed end 214.

Each of the first solar reflector 202 and second solar reflector 204 may have parabolic reflective surfaces 203, which are capable of focusing solar radiation. It is preferred that the reflective surfaces 203 be smooth, without irregularities and micro hills and valleys that cause deviations in reflected light. The concentration ratio of standard solar flux (defined at 1,000 W/m$^2$ at Standard Test Conditions) reflected onto the absorber (e.g., solar collection element 206) is best within a range of 2-6 times. Thus, the absorber is struck by 2-6 times more solar radiation than it would receive without the reflectors.

The reflectors (e.g. 202 and 204) used in the solar cooking apparatus have the advantage of not having to be adjusted so often for following the sun. The target (or solar collection element 206) may have a rounded surface to intercept the focused radiation from the outer rim of the reflector as well as from the bottom.

The reflectors herein may be short-focus parabolic reflectors. Since the parabolic reflector does not have a set radius, it must be discussed in general sizing terms in relationship to the diameter of an absorber (e.g. the absorptive layer of an outer layer of an inner tube of a solar collection element, as described below). For example, if a solar collection element (e.g., solar collection element 206) has a diameter of two inches and solar reflectors (e.g., first solar reflector 202 and second solar reflector 204) that are six inches in width, then there is solar concentration ratio of about three fold.

The collector area or focus point is best in a range of 15-50% of the reflector's area. The collector (or solar cooking apparatus) is best with an absorptivity greater than 70%. The current model has an absorptivity above 90%. The re-radiation area is generally the same as the collector area and the emissivity is very close to zero. This low emissivity is due largely to the anti-reflective copper layer on the outside of the inner tube 208.

In one embodiment, first solar reflector 202 and second solar reflector 204 are each parabolic reflectors that are symmetrically arranged about the solar collection element 206. The parabolic reflectors each have a reflective surface 203 formed by any reflective material (e.g., anodized aluminum) or any other material capable of being formed into a parabolic shape and coated with a reflective layer. Representative reflective materials may include polished aluminum, stainless steel, chrome, mylar, silvered film, aluminized plastic film, metallic paint, etc.

Each of the first solar reflector 202 and second solar reflector 204 may be a parabolic reflector that may each be open at the axial ends. The parabolic reflectors may each have an elongated source/sink that extends along the axis of the reflecting surface 203 and may each be adjustable through a geometric surface generated by rotating a parabola axes, relative to the solar collection element 206. The solar reflectors each can articulate along 90° of angular rotation. The first solar reflector 202 and second solar reflector 204 may be rotated about a solar collection element axis S into an opened position, a closed position or someplace between the opened and closed positions. For instance, the solar reflector may be adjustable on a plane perpendicular to the solar collection element axis, and focusing radiation upon the solar collection element when the first and/or second solar reflectors are in an opened position, the first and second solar reflectors protectably encase the solar collector when in a closed position. These combinations of features have certain advantages over other solar cookers. For example, U.S. Pat. No. 5,676,128 shows dual reflectors and a solar collection element, which teaches the need for additional protective features for the solar collection element and concave solar reflectors, which are incapable of focusing the amount of energy required to sufficiently perform the applications of the present invention.

The solar collection element 206 may be an evacuated tube having a predetermined diameter in accordance with the desired cooking application (e.g. a small diameter solar collection element may be desirable for sterilization of instruments or for cooking small foods, white a large diameter solar collection element may be desirable for baking/roasting a small whole chicken). For example, the solar collection element may be a twin-glass tube, which consists of two glass tubes made from strong borosilicate glass. The outer tube 210 is transparent allowing light rays to pass through with minimal reflection. The exterior of the inner tube 208 forms an absorptive layer coated with a special selective coating (e.g., aluminum-nitrile/aluminum, aluminum-nitrile/stainless steel/copper coatings, borosilicate/aluminum/stainless steel/copper) which may comprise two or more layers, and features excellent solar radiation absorption and minimal reflection properties. The top of the two tubes are fused together and the air contained in the space between the two layers of glass is pumped out while exposing the tube to high temperatures. This "evacuation" of the gases forms a vacuum, which is an important factor in the performance of the evacuated tubes due to insulating properties. This arrangement of features permits the internal temperature of the inner tube 208 to achieve temperatures in excess of 400° F. (and in excess of about 700° F. under optimal solar conditions) while the outer tube 210 of the solar collection element 206 remains safe and cool to the touch.

In order to maintain the vacuum between the two glass layers, a barium getter is used. During manufacturing of the evacuated tube this getter is exposed to high temperatures which cause the bottom of the evacuated tube to be coated with a pure layer of barium. This barium layer actively absorbs any $CO$, $CO_2$, $N_2$, $O_2$, $H_2O$, and $H_2$ out-gassed from the evacuated tube during storage and operation, thus helping to maintaining the vacuum. The barium layer also provides a clear visual indicator of the vacuum status. The silver colored barium layer will turn white if the vacuum is ever lost. This makes it easy to determine whether or not a tube is in good condition.

The solar collection apparatus may also have a shatter-resistant feature that essentially encases the outer tube 210. This feature not only protects the glass tube from exterior shocks, it also protects the user in the unlikely event that the evacuated tube is broken (from impact or thermal shock). Representative embodiments of the shatter-resistant feature include a polymeric spray-on coating, tempered glass, an adhesive film, shrink coating, and/or a protective sleeve (plastic or glass), which the solar collecting element can be fitted into.

The solar collection apparatus may also have thermal shock resistance. For example, solar collection element 206 may comprise Vycor® glass (Corning, Inc.).

Figure 3:
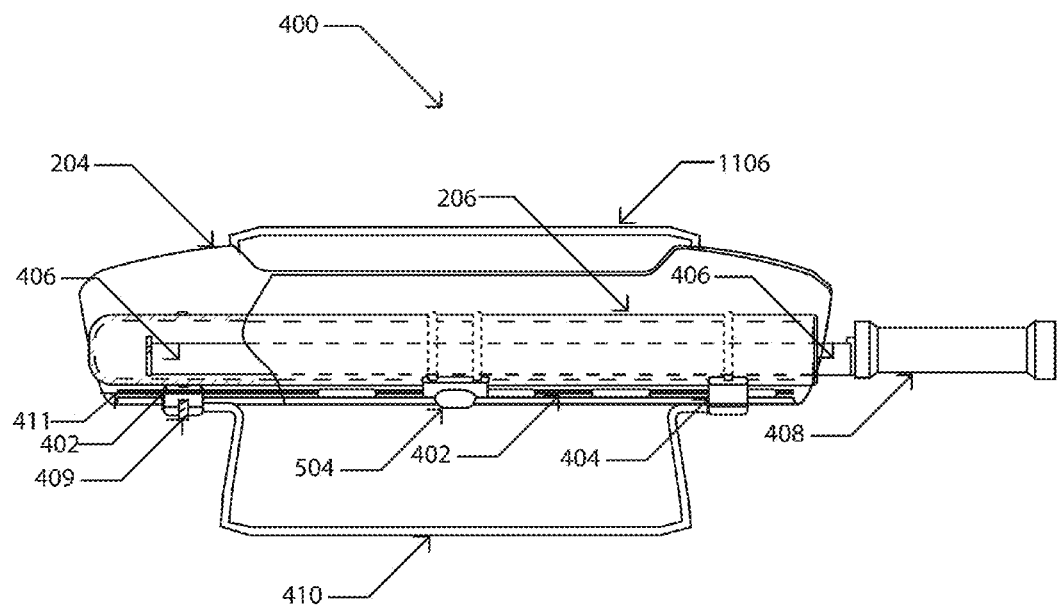
FIG. 3 is a side view of a solar cooking apparatus showing a cooking implement, brackets, and legs.
Figure 4:
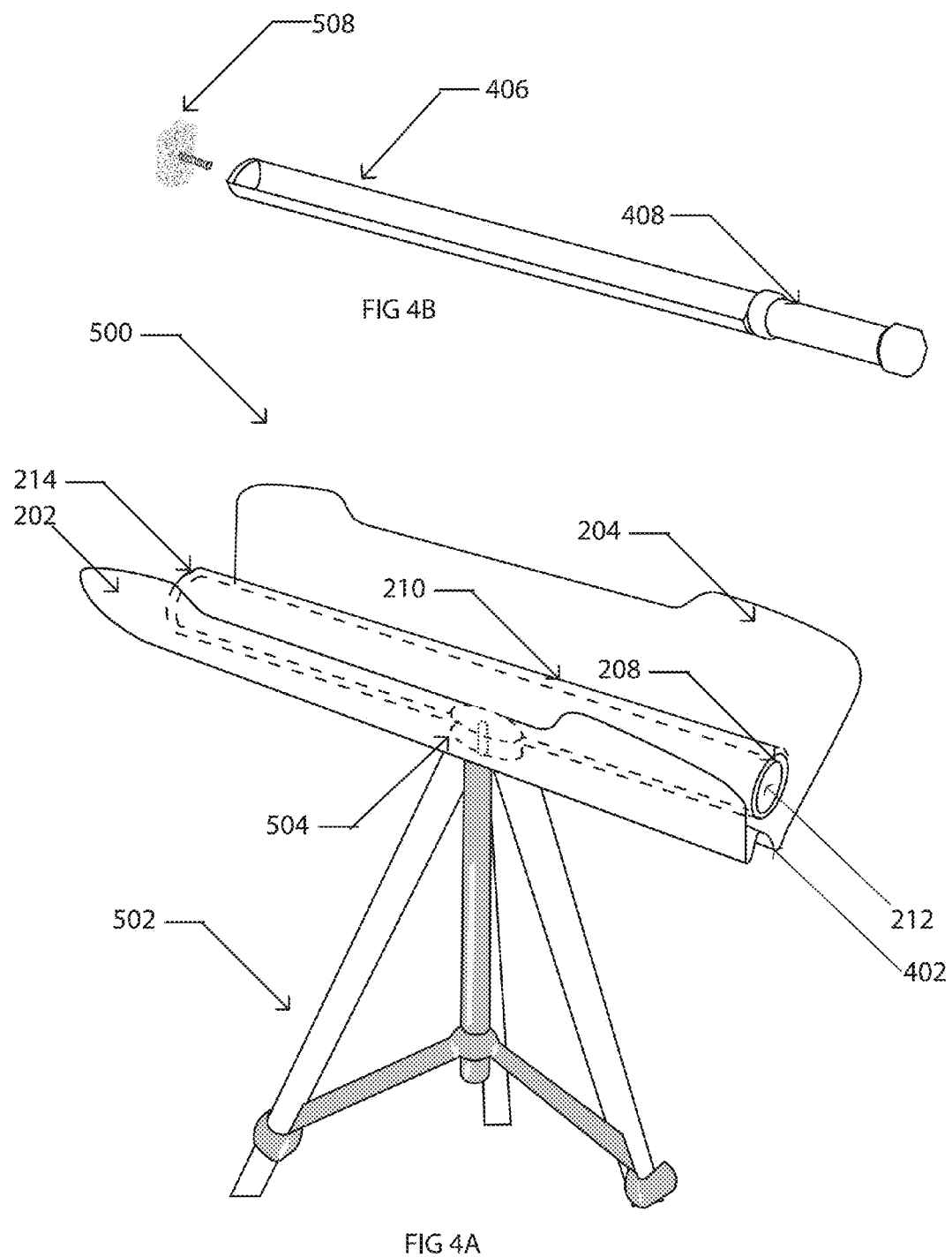
FIG. 4A is a perspective view of a solar cooking apparatus in an opened position showing it attached to a tripod stand.
FIG. 4B is a perspective view of a cooking implement along with cleaning tool.

In FIGS. 3 and 4A-B, a solar cooking apparatus may have any of a hinge 402, a bracket 404, a cooking implement 406, a cooking implement handle 408, a tripod stand 502, a solar cooking apparatus handle 1106, and a tripod stand fastener 504.

A hinge 402 may be one or more of any type of bearing that connects each of or both of the first solar reflector 202 and second solar reflector 204 to the solar cooking apparatus 400 or 500 (e.g., at a bracket or base frame, discussed below). The hinge 402 has a range of motion that accommodates moving each of the first solar reflector 202 and second solar reflector 204 between closed and open positions. Hinges may be made of flexible material or of rigid moving components. A hinge may first attach to each of or both of the first solar reflector 202 and second solar reflector 204 in an optimal optic relationship to the solar collection device 206. The hinges permit movement of the solar reflectors for portability, protection and adjustments in solar energy capture intensity. In some cases, the reflectors may not be attached to a hinge but instead place in a cradle or frame to create the necessary optics for optimal performance.

In one embodiment, the hinge 402 may be at least one continuous hinge (e.g., a piano hinge), wherein the hinge 402 attaches the solar reflectors to the solar cooking apparatus 400 at at least one bracket 404. The bracket 404 provides attachable support for each of a solar collection element 206 and hinge 402.

In another embodiment, the solar cooking apparatus 500 may have a tripod stand 502, a cooking implement 406 and/or a cleaning tool 508. The cleaning tool 508 may have any shape capable of fitting within the inner tube 208 of the solar collection element 206, made from any material capable of cleaning baked on waste (e.g. food, grease or carbon buildup) within the inner tube 208. Suitable materials for cleaning tool 508 may include a knit copper mesh, steel wool, or nylon bristle brush.

The tripod stand 502 may have telescopic legs, each of which is adjustable to a length to achieve desired orientation of the solar cooking apparatus 500 relative to position of the sun. The legs can each be adjusted to varied lengths that accommodate said orientation, even when the solar cooking apparatus 500 is set upon an uneven surface. When the solar cooking apparatus is ready to be stored, the tripod stand may be collapsed, detached from connection point 504, and stowed independently.

The stands of the invention (e.g., aforementioned stand 502 and other described herein, 410) provide for both portability and stability of a solar cooking apparatus. However, it should be appreciated that the solar cooking apparatus may be alternatively fixed to any number of holding devices (e.g., stands) that are not required to be portable. In another embodiment of the invention, the solar cooking apparatus may be fixed to a yard post or pedestal. In yet another embodiment of the invention, the solar cooking apparatus may be fixed to a swing arm attached to a boat or recreational vehicle.

Figure 5:
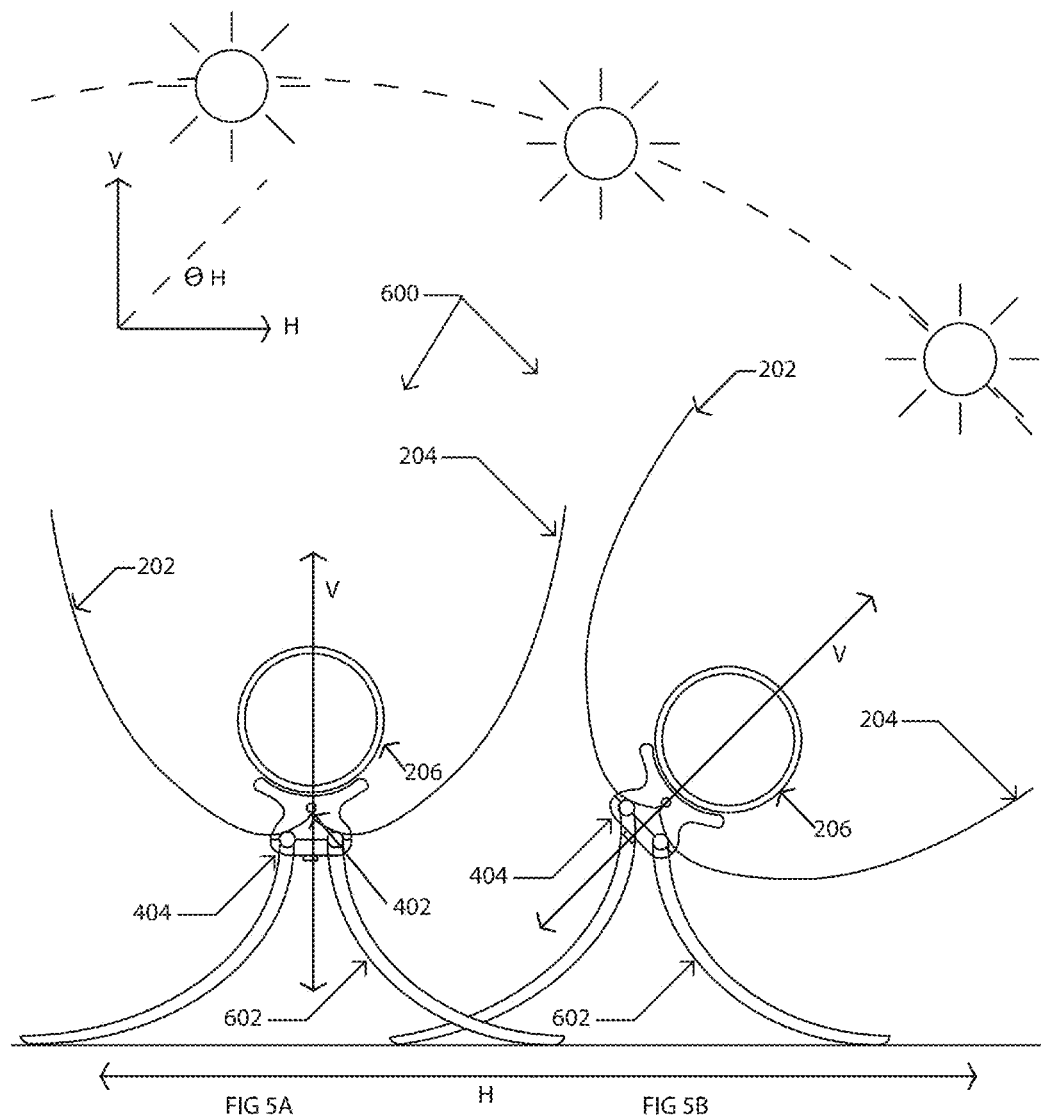
FIG. 5A is an end view of a solar cooking apparatus in an opened position showing a horizontal stand with the sun's rays coming from directly above
FIG. 5B is the solar cooking apparatus of 6A showing the sun's rays at 45 degrees above the horizon, showing arrange of motion relative to the vertical.
Figure 6:
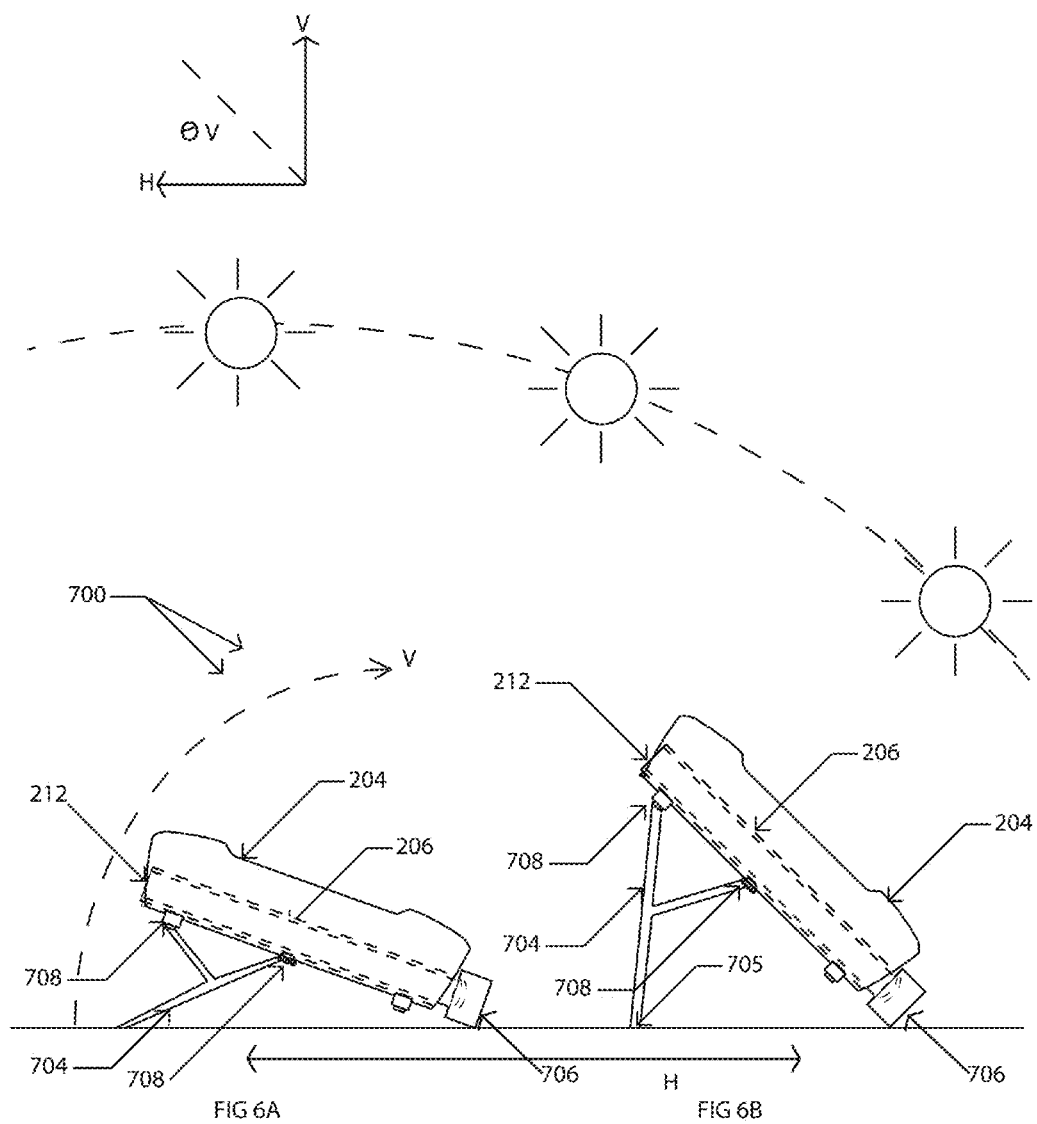
FIG. 6A is a side view of a solar cooking apparatus showing a vertical stand showing the sun's rays from a more vertical position
FIG. 6B is the solar cooking apparatus of 7A showing the sun's rays from a lower angle showing a range of motion relative to the horizontal.
Figure 7:
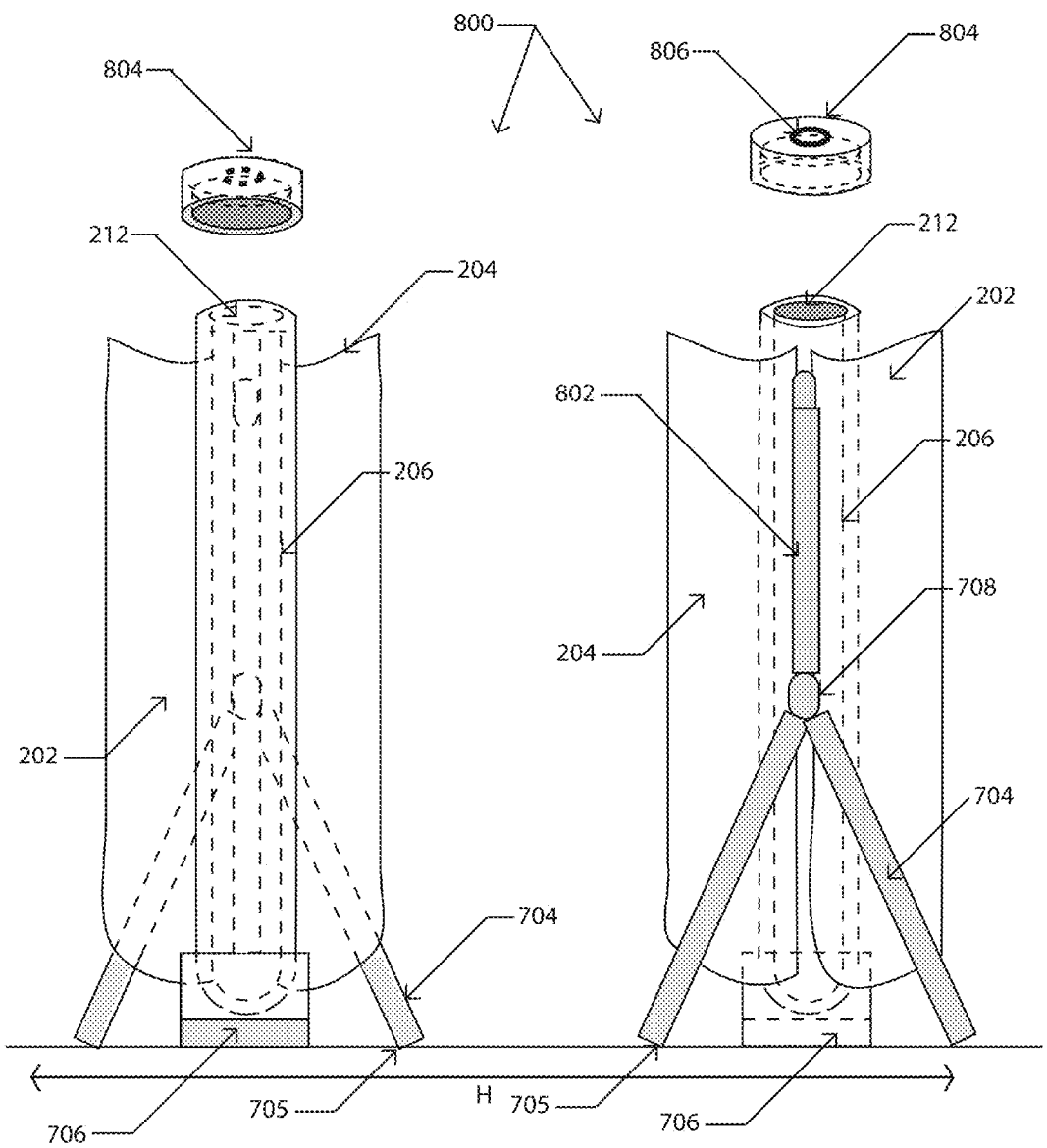
FIG. 7A is a front end view of a solar cooking apparatus showing a vertical stand and a base frame.
FIG. 7B is a bottom view of a solar cooking apparatus showing a vertical stand and a base frame.

In FIG. 5A and FIG. 5B, a solar cooking apparatus may have a formed stand 602 that is rotatable about an apparatus axis to position the apparatus about perpendicular to the sun's rays at a vertical angle $\theta_H$. With a horizontal solar collection axis H, the solar cooking apparatus is adjusted through minor movements in the rotatable stand to achieve the proper horizontal tilt angle ($\theta_H$) for orientation to be roughly perpendicular to the sun's rays. In this embodiment, the hinge 402 attaches the solar reflectors to the solar cooking apparatus via a bracket 404.

Turning to FIGS. 6A-B and 7A-8B, a solar cooking apparatus 700 or 800, respectively, may have a tiltable stand. In one embodiment, the tiltable stand comprises at least one leg 704, at least one leg foot 705, and a base foot 706. The solar cooking apparatus 700 and solar cooking apparatus 800 are each tiltable relative to a vertical solar collection element axis V. The legs 704 can each be adjusted to varied lengths that accommodate a tilt angle from 0 to 90° (the horizon is 0°). The legs can stabilize the solar cooking apparatus even when set upon an uneven surface. When the solar cooking apparatus is ready to be stored, the stand may be collapsed and stowed.

The embodiment with a vertical solar collection element axis allows for the application of heating liquids. When heating liquids, it is more efficient to utilize a pressure seal or tight fitting cap 804 made of a relatively heat resistant material such as metal, PVC, bakelite, silicone, etc. The cap could be screwed in place over the solar collection element opening 212 or applied with a light force via, slip seal. The cap 804 may have a pressure release valve 806 that allows hot gas or expanding fluids to escape as the temperature inside the solar collection element increases. A low pressure relief range between about 3-15 psi allows proper heat accumulation in the fuels while preventing potentially damaging levels of pressure inside the solar collection element.

In another embodiment, the tiltable stand may be a sliding stand, wherein the stand has at least one telescopic leg (e.g., leg 704) and/or is pivotably attached at the end opposing the at least one leg foot (e.g., foot X) to a track upon a base frame (e.g, base frame 802). The stand may be slid along the track and fixed to the stand by a first locking mechanism, in a position on the track. Subsequently, the stand may be pivoted to alter vertical tilt angle $\theta_V$ (See, e.g., FIG. 7) and fixed by a second locking mechanism, at a user defined angle, relative to a stand foot (e.g., stand foot 706). The user defined angle (e.g., $\theta_V$) may altered further by changing the telescopy of the at least one telescopic leg.

Figure 8:
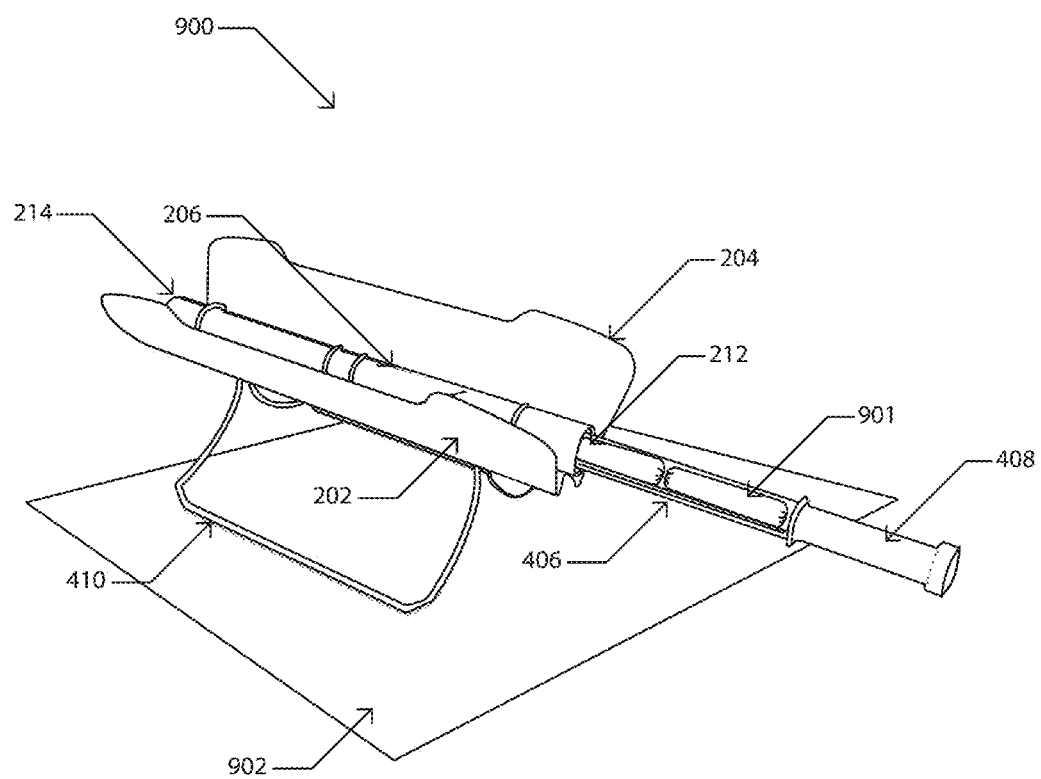
FIG. 8 is a perspective view of a solar cooking apparatus in an open position on a horizontal plane, which also shows a stand and partially loaded cooking implement.
Figure 9B:
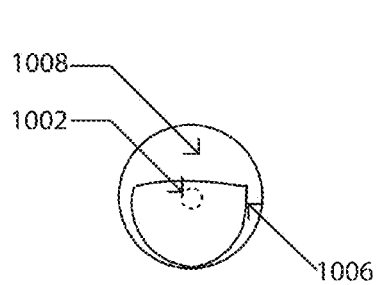
FIG. 9B is an end view of a cooking implement.
Figure 9C:
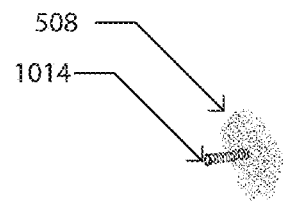
FIG. 9C is a perspective view of a cleaning implement.
Figure 9A:
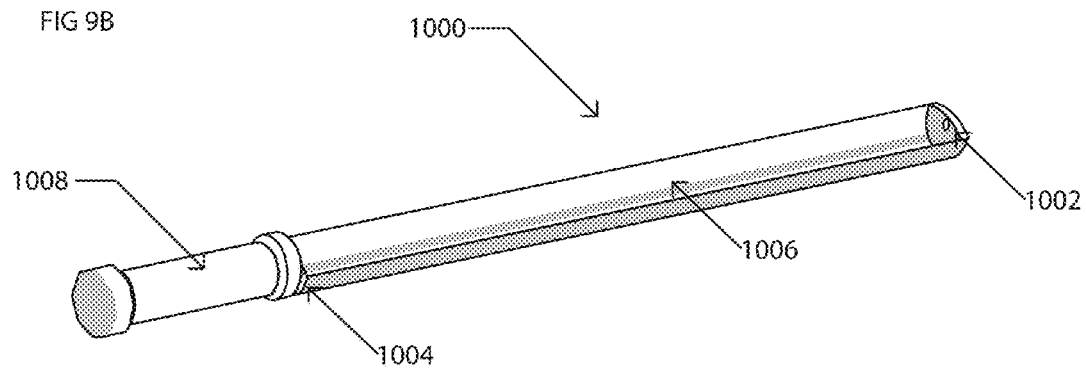
FIG. 9A is a perspective view of a cooking implement.
Figure 9D:
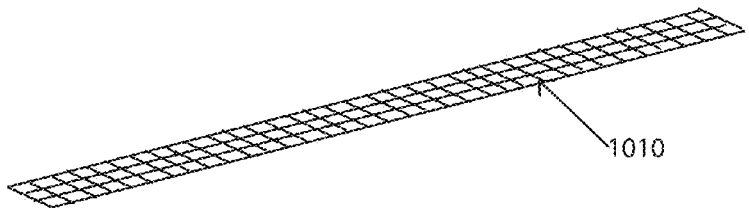
FIG. 9D is a perspective view of a mesh cooking implement.

As shown in FIG. 8, a solar cooking apparatus may be opened and deployed on a horizontal surface 902 (e.g. table, ground, pavement, etc.) by utilizing legs 410. In this example, the cooking implement 406 has been loaded with sausage 901 and partially inserted inside the solar collection element 206 via the open end 212.

In FIGS. 9A-D, a solar cooking apparatus may be used with a trough cooking implement 1000. In one embodiment, the trough cooking implement 1000 comprises: a first implement end 1002; a second implement end 1004; a trough 1006; an implement length at least equal in length to the inner tube length; and a diameter less than the inner tube 208 diameter, wherein the first implement end 1002 is closed and insertable into the inner tube 208 open end. 212 of solar collection element 206, the second implement end 1004 can be fashioned with a heat-resistant cooking implement handle 1008. In one embodiment the cleaning implement 508 is attached to the first implement end 1002 by any means of suitable connection 1014 to create secure, retrievable bond between the cleaning implement and the cooking implement 1000.

In FIGS. 10A-D, a solar cooking apparatus is shown to be open FIG. 10A and then fixed into a closed position FIG. 10B for protection of the solar collection element 206 and/or transport. FIG. 10C shows the closed solar cooking apparatus along with integrated handle 1106 for easy carrying of the closed unit. In this embodiment bracket 404 serves as a hinge wherein the legs 410 are pivotable to become handle 1106 when in the closed position.

The solar cooking apparatus may be used with a cooking implement such as a skewer cooking implement 1202 or 1206 (as shown in FIGS. 11A and 11J) or a trough cooking implement 1000 (As shown in FIG. 9). The cooking implement is fashioned to fit within the inner tube 208 of the solar collection element 206. The cooking implement may also be enclosable with a cap 804 which may additionally be fashioned with a pressure release outlet.

FIGS. 11A-J represent a number of cooking implements and/or accessories that could be used with the solar collection element described above.

The cooking implement can take on many forms in order to achieve the desired application. In one embodiment the cooking element receives a cleaning scrubber which may be inserted into the solar cooking apparatus. The scrubber may or may not be abrasive (e.g., cleaning tool 508) and may be used along with up to several ounces of water and a detergent after use. In another embodiment, the cooking implement (e.g., trough cooking implement 1000) may have a grease collection feature. When used in a vertical solar cooking apparatus 700 a grease collection feature 1214 can be at an end terminal to gravity flow such as the closed end of the solar collection element 214. In this embodiment, the grease collection cup 1214 is equipped with a heat resistant tie that would extend outside the solar collection element 206 so it is easily deployable and retrievable from the bottom of the solar collection element. When used in a horizontal solar cooking apparatus 400 the grease collection feature 1010 can be formed to fit within the open trough of the cooking implement 1000. The grease collection feature may perform a sieve-like function to compartmentalize and thereby eliminate grease spillage into the solar collection element (e.g., solar collection element 206). The grease collection feature promotes low-fat cooking by allowing cooked-out grease to flow away from a food while cooking in a cooking implement inserted into a solar collection element of an open solar cooking apparatus.

The grease collection features 1214 and 1010 explained above may have additional functions, such as holding a special material or fluid for various cooking applications. For example, wood chips can be cooked in grease collection features 1214 or 1010 to add a smoked flavor to foods inside a cooking implement (e.g. cooking implement 1000).

In other embodiments, some of which are exemplified in FIGS. 11A-H, a cooking implement may also include: a French Press plunger 1204 for sifting loose tea or coffee; a bent shaft for stirring 1206, a temperature gauge 1208 clipped to the outside of the solar cooking apparatus with a probe 1210 within the inner tube 208, a bottle brush for cleaning, a vaporizer for creating aromatic gases 1212 with an inlet 1216 for incoming air and an outlet 1214 to release the vapor infused heated air, a distillation device for making spirits, a liquid tight cap 804 with vent 806, parchment paper for baking with easy cleanup, a wire mesh tray 1226 for cradling larger foods (e.g. whole chicken, bread loaf) sauce trays, a closed cylinder 1220 with liquid tight cap 1222 and vent 1224 and skewer rod 1202.

Figure 12A:
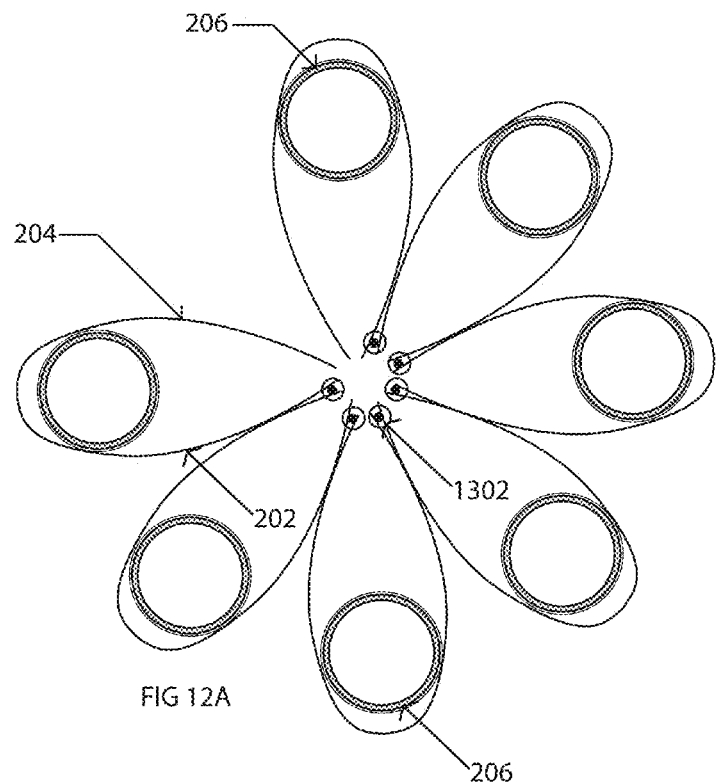
FIG. 12A is an end view of a solar cooking apparatus in a multiplex arrangement in a closed position with a plurality of solar collection elements.
Figure 12B:
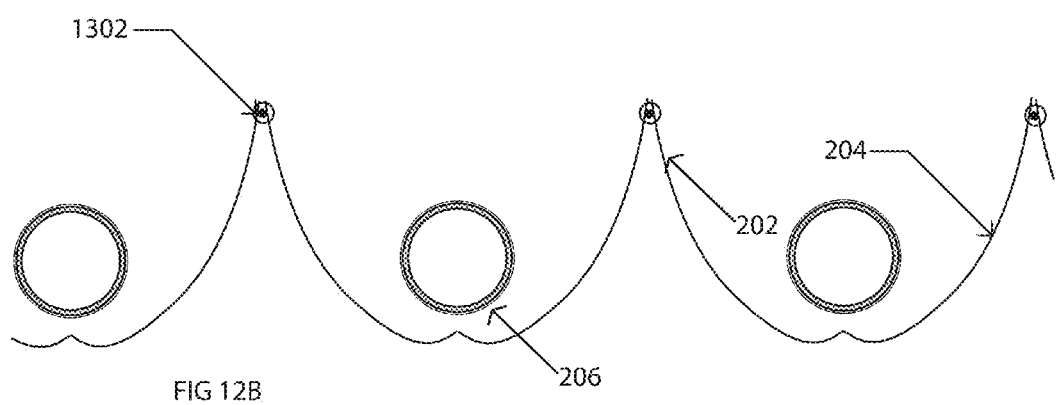
FIG. 12B is an end view of a solar cooking apparatus in a multiplex arrangement in a closed position.
Figure 13A:
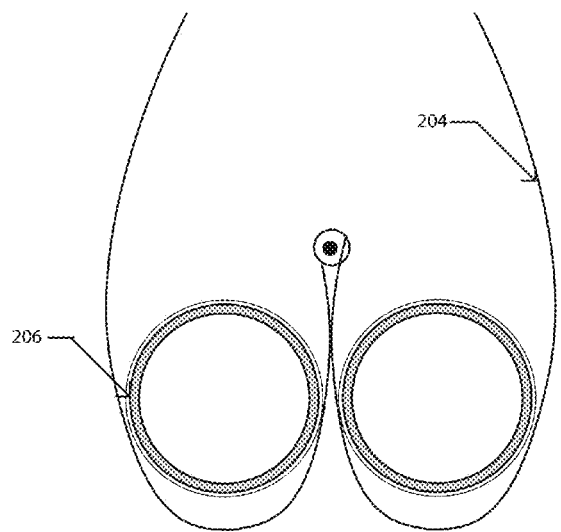
FIG. 13A is an end view of a solar cooking apparatus in a multiplex arrangement in an open position with two solar collection elements stacked among a set of two reflectors.

FIGS. 12A-B show embodiments of multiplex units wherein several solar collection elements are connected to form one multiplex cooking apparatus, several cooking apparatuses (e.g. a multiplex cooking apparatus) may be attached together in a parallel arrangement to form an apparatus having greater than one solar collection element (e.g., solar collection element 206) and both of a first solar reflector 202 and second solar reflector 204 per solar collection element. Such multiplex embodiments are attachable to a stand in either a substantially vertical or horizontal orientation to the horizon (not shown). In FIG. 13A, solar collection elements are each protected by two reflectors 202 and 204 which are connected to another set of reflectors by a hinge or latch 1302.

Figure 13B:
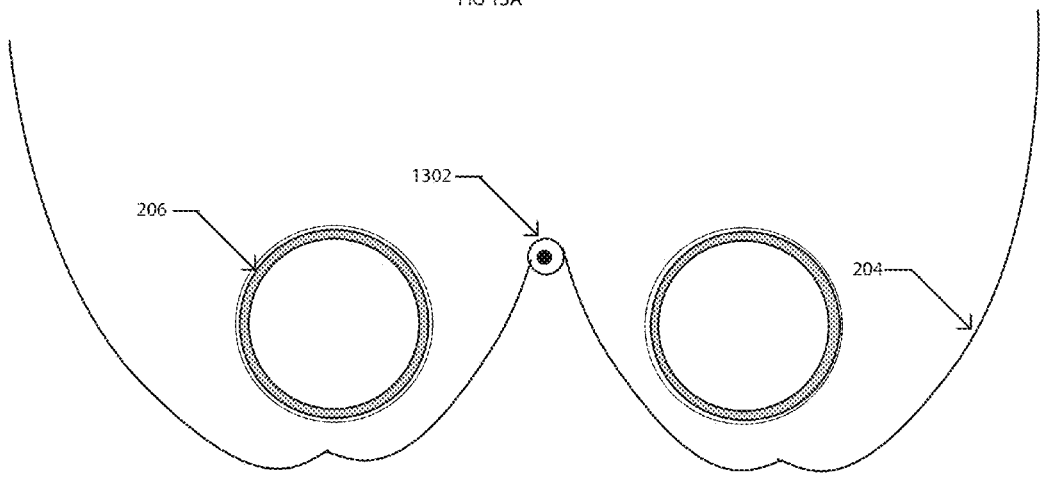
FIG. 13B is an end view of a solar cooking apparatus in a multiplex arrangement in an open position with two solar collection elements.

FIGS. 13A-B show embodiments of multiplex units wherein, two cooking apparatuses are arranged in tandem and are attached together (not showing features such as a stand).

Figure 14A:
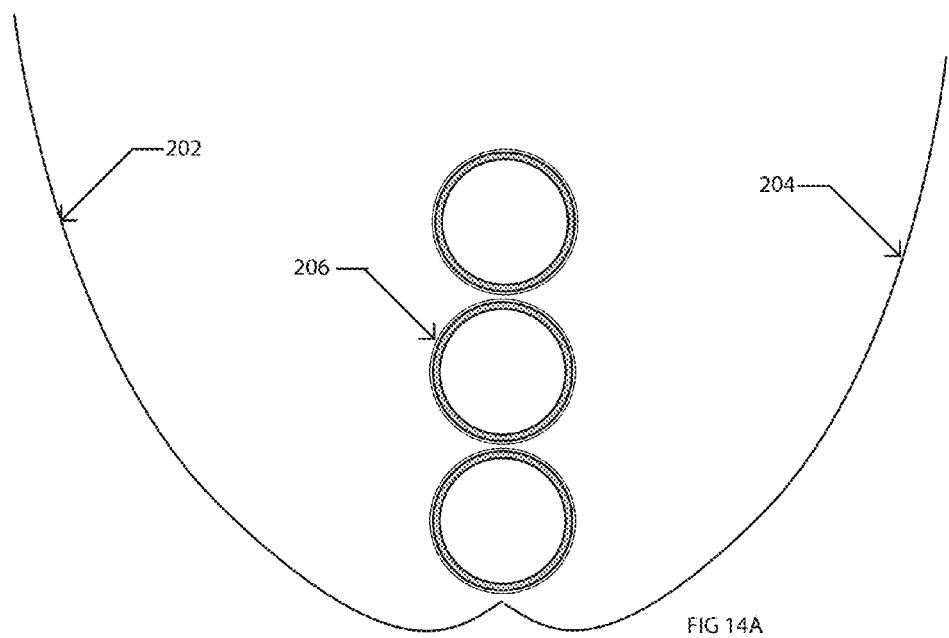
FIG. 14B is an end view of a solar cooking apparatus in a multiplex arrangement in an open position with three solar collection elements.
Figure 14B:
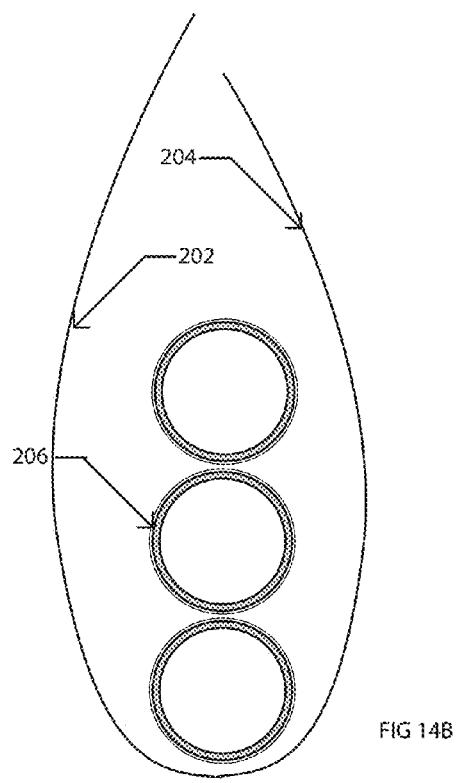

FIG. 14A shows solar collection elements in closed positions where each solar collection element 206 is protected by two reflectors 202 and 204 which are connected to another set of reflectors by a hinge or latch 1302.

While several embodiments of a solar cooking apparatus were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claim are embraced within their scope.

EXAMPLES

Example 1:

The solar cooking apparatus in this example is tubular with 24" in length (61 cm), 1¾" (45 mm) inside diameter, 2¼" (57 mm) outer diameter surrounded by an anodized aluminum reflecting surface running the length of the tube which folds out to 8" in width. The 1¾" internal diameter is large enough to accommodate various meats, vegetables, and frozen finger-style foods while remaining highly portable. The entire apparatus has a dry weight of about three pounds (1.4 kg). It is capable of heating as much as 30 ounces (@ one liter) of fluid. Most fluids reach near boiling temperatures. About 4-8 ounces of fluids can be elevated to about 170° F. (77° C.) in a short time, depending on irradiance conditions (described in greater detail below).

Example 2:

The example described below was conducted at GPS coordinates 35°34'48"N 82°33'21"W. The weather conditions were as follows: Relative Humidity 63%, Winds 1.2 MPH from variable, scattered clouds 4600 ft, Heat index 91° F., dew point 71° F., UV 9 out of 16, Rainfall 0.00 in, visibility 10.0 miles.

A Flux 62 MINI IR Thermometer—Infrared, point-and-shoot style thermometer was used to measure the internal temperature of a solar collection element.

A DayStar Solar Irradiance Meter was used to measure sunlight intensity/quality by using a solar PV cell and algorithm, output given in Watts per Square Meter only, Standard Test Conditions for Solar PV is set at fill sun of 1,000 w/m². The irradiance meter was pointed in the direction of the sunlight.

At 9:37 AM the outside air temperature and temperature within the solar collection element were measured at 77° F. The solar cooking apparatus was removed from its carrying case, and unfolded into an open position. Subsequently, the solar cooking apparatus was oriented by tilting the solar cooking apparatus toward the rising sun in the east. The solar cooking apparatus was locked into position at a horizontal tilt angle of about 45° from vertical.

At 9:43 AM the internal temperature of the solar collection element was measured to be 194° F. As the solar cooking apparatus heated, the internal temperature of the solar collection element was measured to be continued to increase as shown in Table 1 below:

TABLE 1

| Time | Temperature | Irradiance |
|---|---|---|
| 9:37 AM | 77° F. | 850 w/m² |
| 9:43 AM | 194° F. | |
| 9:45 AM | 225° F. | 900 w/m² |
| 9:47 AM | 268° F. | |
| 9:49 AM | 304° F. | |
| 9:52 AM | 363° F. | 950 w/m² |

Once the internal temperature of the solar collection element achieved an internal temperature of about 400° F., food (e.g., hot dogs) was placed into a trough style cooking implement. In this example, four scrambled eggs, chopped onions and some shredded cheese were placed in the cooking trough. The combination of ingredients were fully cooked at 30 minutes, having delicious taste and firm texture.

After use, the cooking implement was placed into a sink and rinsed with water. A copper scrubber, which was formed for cleaning the trough, was used to scrub the trough clean in less than about one minute.

The cooker was permitted to cool down for about 5 minutes before applying the cooking implement, with a copper scrubber attached to the insertable end, into the solar collection element for cleaning (The cooking element combined with the scrubber may be used as a cleaning tool). A few drops of dish soap were applied to the copper scrubber and a plunge/twist motion was conducted between implement and cooker for about one minute. Next some lukewarm water was added into the solar collection element. After about 30 seconds more the tube was tipped out into the sink while about five ounces of dirty, brown fluid poured out. The user then rinsed the tube with clean luke warm water and began a slight shake to tip the water back and forth in the tube. This water was poured into the sink and found to be clear. One last rinse and then the cooking device and implement were independently placed on a table outside, in a closed position, to dry for repacking into the carrying case.

The invention claimed is:

1. A solar cooking apparatus, comprising:
   a first solar reflector;
   a second solar reflector;
   a solar collection element, comprising an inner tube having an inner tube diameter, an inner tube length, an inner tube open end, an inner tube closed end, an interior surface enclosing an interior space, and an exterior surface, the interior and exterior surfaces extending the inner tube length, wherein the exterior surface comprises one or more layers consisting essentially of aluminumnitrile/aluminum, aluminum-nitrile/stainless steel/copper, or borosilicate/aluminum/stainless steel/copper, and the outer tube having an outer tube diameter, an outer tube length, an outer tube open end, an outer tube closed end, and a barium getter, wherein the outer tube diameter and the outer tube length are both greater than the inner tube diameter and the inner tube length, wherein the inner tube is fixed inside of the outer tube and sealed between the inner open end and outer tube open end to form a hollow space extending the length of the exterior tube under vacuum pressure between the exterior wall of the inner tube and the outer tube;
   a solar collection element holder, wherein
   the first solar reflector and the second solar reflector are concave and parabolic, and are in a substantially symmetrical arrangement to a solar collection element axis, each reflector having a range of motion upon a solar reflector hinge on a plane perpendicular to the solar collection element axis, to focus solar radiation at the solar collection element from a reflective surface when the first or second solar reflectors are in an opened position, the first and second solar reflectors protectably encase the solar collector when in a closed position, the solar reflector hinge is mounted upon a bracket aligned with the solar element axis that allows for the solar cooking apparatus to rotate on a horizontal plane parallel to the ground when the solar cooking apparatus is in an unfolded standing position;
   a cooking implement that fits within the inner tube, having a length less than or equal to the inner tube length and an open trough configuration;
   a cleaning implement that is attachable to a first cooking implement end; and
   a foldable stand to put the solar cooking apparatus in a horizontal orientation for use when the foldable stand is in the unfolded standing position, comprising two curved legs having a contour that follows the first and second solar reflectors in the closed position and form a handle when two curved legs are in a folded position.

2. The cooking apparatus of claim 1, wherein the solar collection element is comprised of borosilicate glass or Vycor® glass.

3. The cooking apparatus of claim 1, wherein the solar collection element is enclosable with a cap element that is attached at the inner tube open end to withstand cooking pressure in the interior space.

4. The solar cooking apparatus of claim 1, wherein the first solar reflector and the second solar reflector are comprised of at least one of anodized aluminum, stainless steel, chrome, mylar, silver film, plastic film or metallic paint.

5. The solar cooking apparatus of claim 1, wherein the first and second solar reflectors are interlockable in the closed position or closable to protect the solar collection element and the reflective surface of each solar reflector.

6. The solar cooking apparatus of claim gi, the cooking implement comprising:
   a first implement end;
   a second implement end;
   an implement length less than or equal in length to the inner tube length;
   a trough having a length less than the cooking implement length; and
   a diameter less than the inner tube diameter, wherein the first implement end is closed and insertable into the inner tube open end, the second implement end is fashioned with a heat-resistant cooking implement handle.

7. The solar cooking apparatus of claim 6, wherein the cooking implement has a concave cooking surface extending between the first implement end and the second implement end, the concave cooking surface being accessible when the cooking implement is outside of the solar cooking apparatus.

8. The solar apparatus of claim 6, the cooking implement open trough configuration is a concave cooking surface between 40% to 70% round.

9. The solar cooking apparatus of claim 1, being portable.

10. The solar cooking apparatus of claim 1, the foldable stand comprising a tripod.

* * * * *